United States Patent [19]

Matsuura

[11] Patent Number: 5,083,278
[45] Date of Patent: Jan. 21, 1992

[54] KNOCKING DETECTION DEVICE FOR AN AUTOMOTIVE ENGINE

[75] Inventor: Takashi Matsuura, Tokyo, Japan

[73] Assignee: Fuji Jukogyo Kabushiki Kaisha, Tokyo, Japan

[21] Appl. No.: 507,497

[22] Filed: Apr. 11, 1990

[30] Foreign Application Priority Data

Apr. 14, 1989 [JP] Japan ................................. 1-95688
Sep. 29, 1989 [JP] Japan ................................ 1-256309

[51] Int. Cl.⁵ .............................................. F02P 5/14
[52] U.S. Cl. ............................... 364/431.08; 123/425
[58] Field of Search ............... 73/35 K; 123/416, 417, 123/425, 435; 364/431.08

[56] References Cited

U.S. PATENT DOCUMENTS

4,429,565  2/1984  Utsumi et al. ................... 73/35 K
4,710,881 12/1987  Mouri et al. ................. 364/431.08
4,750,103  6/1988  Abo et al. .................... 364/431.08
4,770,144  9/1988  Sakakibara ...................... 123/425

Primary Examiner—Salvatore Cangialosi
Attorney, Agent, or Firm—Beveridge, DeGrandi & Weilacher

[57] ABSTRACT

There is disclosed an improvement of a knocking detection device for an automotive engine mounted on a vehicle having a knock sensor for detecting analog vibration waveforms of the engine, and a crank position sensor for producing signals corresponding to a predetermined crank angle of the engine. The device comprises a conversion circuit for converting the analog waveforms detected by the knock sensor into digital data every predetermined sampling period; a decision circuit for deciding a first conversion term corresponding to no knocking period and a second conversion term corresponding to knocking possibility period in one cycle of the engine; a setting circuit for setting a discrimination level based on a first average value of the digital data from the conversion circuit during the first conversion term decided by the decision circuit; calculation circuit for calculating knocking level based on a second average value of the digital data from the conversion circuit during the second conversion term decided by the decision circuit; and a determination circuit for determining knocking occurrence by comparing the knocking level calculated by the calculation circuit with the discrimination level set by the setting circuit, so as to determine knocking occurrence when the knocking value is larger than the discrimination level.

8 Claims, 8 Drawing Sheets

KNOCKING DETECTION DEVICE FOR AN AUTOMOTIVE ENGINE

BACKGROUND OF THE INVENTION

The present invention relates to a knocking detection device for detecting knocking of an engine mounted on a vehicle by directly converting an output of a knock sensor from an analog waveform into digital data.

A recent vehicle has a knocking controller with a knock sensor for detecting the knocking in dependency on abnormal combustion of the automotive engine to prevent the knocking by controlling an ignition timing. The controller is capable of controlling the ignition timing at a knocking limit, so that it is possible to improve power performance of the engine.

The knock sensor is provided at a suitable place to detect pressure vibration in a combustion chamber due to abnormal combustion or mechanical vibration transmitted from the combustion chamber to a cylinder block of the engine.

The determination for occurrence of knocking is disclosed in Japanese Patent Application Laid-open No. 58-30477 (1983) and No. 61-8472 (1986). Thus, a conventional knocking detection device comprises a knock sensor, a filter circuit for selecting a knocking component by limiting a frequency band of signals from the sensor, a peak hold circuit for holding a peak value of signal waveforms, and an analog/digital converter for converting the peak value from analog signal to digital signal. A microcomputer calculates an average value of a plurality of peak values from the converted digital signals and determines whether the knocking occurs or not by comparing the average value with a predetermined value of a knocking determination level.

However, analog circuits such as the filter circuit and the peak hold circuit in the conventional device use elements such as resistors and capacitors respectively having tolerance, so that it is impossible to avoid an error depending on a circuit constant. Every element is selected to set the circuit constant properly, which has many production steps. Many steps and the number of parts of the elements used in the analog circuits increase the production cost.

Furthermore, the elements deteriorate with lapse of time and the circuit characteristics change. Accordingly, the reliability of the analog circuits decreases.

SUMMARY OF THE INVENTION

An object of the present invention is to provide a knocking detection device for an automotive engine, which is capable of processing a vibration waveform without depending upon analog circuits, and which is capable of being constructed at low cost by reducing the number of parts.

The knocking detection device according to the present invention comprises an analog/digital conversion circuit for converting an analog vibration signal from a knock sensor during a predetermined knocking detection interval, into digital data of every sampling predetermined period having the possibility of reproduction of the vibration signal; a decision circuit for deciding a first conversion term corresponding to no knocking period and a second conversion term corresponding to knocking possibility period in one cycle of the engine; a discrimination level setting circuit based on a first average value of the digital data from the conversion circuit during the first conversion term decided by the decision circuit; a calculation circuit for calculating a knocking level based on a second average value of the digital data from the conversion circuit during the second conversion term decided by the decision circuit; and a determination circuit for determining knocking occurrence by comparing the knocking level calculated by the calculation circuit with the discrimination level set by the setting circuit, so as to determine knocking occurrence when the knocking value is larger the discrimination level.

DETAILED DESCRIPTION OF THE PREFERRED EMBODIMENT

There will be described preferred embodiments of a knocking detection device according to the present invention with reference to the accompanying drawings.

Figure 1:
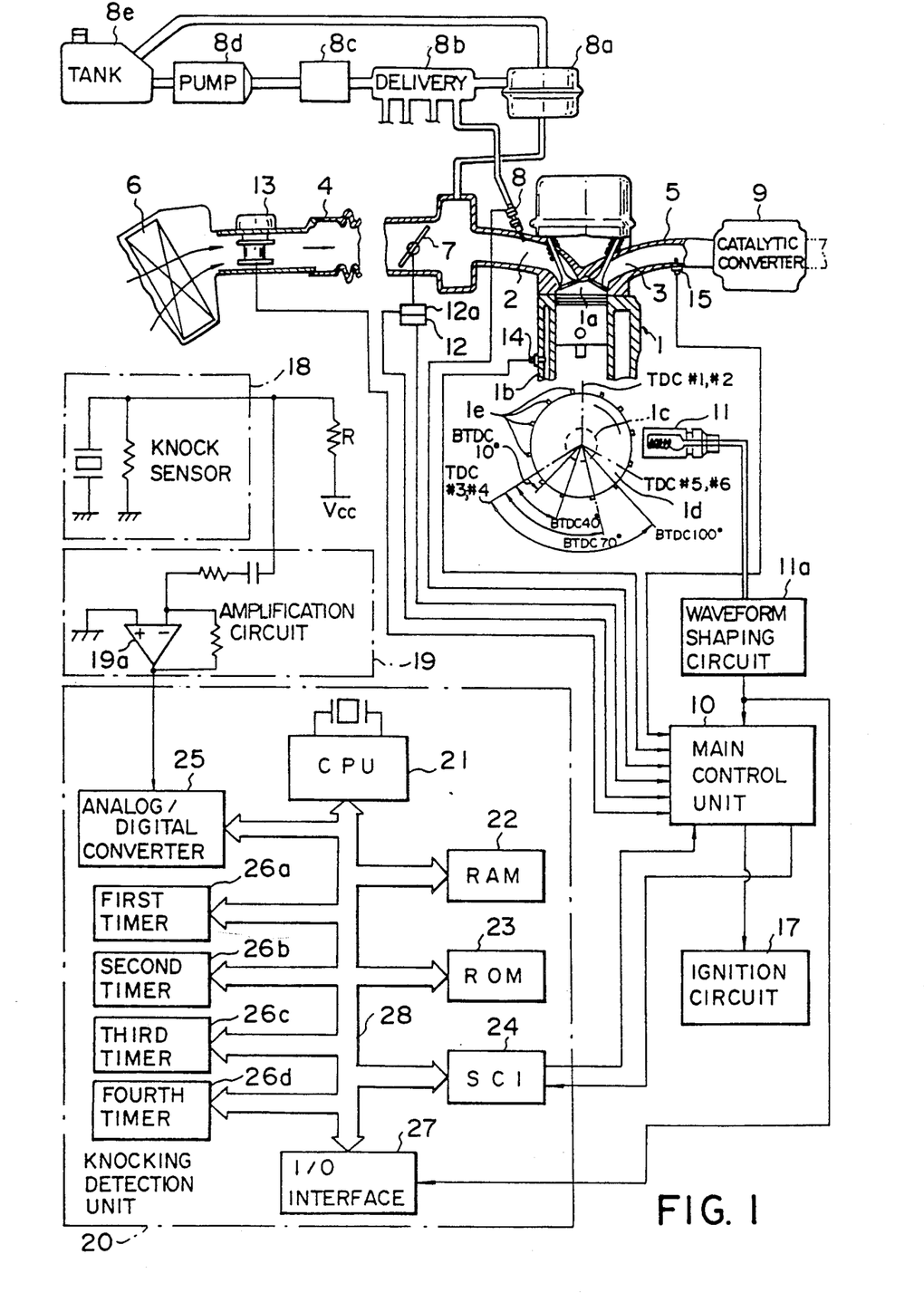
FIG. 1 is a circuit diagram schematically showing a knocking detection device according to the present invention.

FIG. 1 schematically shows an engine control system and a knocking detection device according to the present invention. In the figure, an engine 1 has a combustion chamber 1a, a coolant passage 1b, a crank shaft 1c, and a crank rotor 1d. In each cylinder, the combustion chamber 1a has an intake port 2 communicated with an intake pipe 4, and an exhaust port 3 communicated with an exhaust pipe 5. An air cleaner 6 is communicated with an upstream side of the intake pipe 4. The pipe 4 has a throttle valve 7 at an intermediate position thereof. An injector 8 is disposed at each intake port 2. A fuel injection system comprises the injector 8, a pressure regulator 8a, a delivery pipe 8b, a fuel filter 8c, a fuel pump 8d, and a fuel tank 8e. A catalytic converter 9 is provided in the exhaust pipe 5.

Moreover, the crank rotor 1d is fixedly provided around the crank shaft 1c. A crank position sensor 11 is provided against the outer surface of the rotor 1d. A throttle position sensor 12 is provided at the throttle valve 7 for detecting an opening degree of the throttle valve 7. An idle switch 12a cooperating with the throttle position sensor 12 detects an idling state of the engine. The intake pipe 4 has an intake air quantity sensor 13 on the downstream side of the air cleaner 6. A coolant thermosensor 14 is exposed in the coolant passage 1b of the engine 1, and an exhaust gas sensor such as an oxygen sensor 15 is exposed in the exhaust pipe 5 at the upstream side of the catalytic converter 9.

A main control unit 10 receives several outputs from the throttle sensor 12, the idle switch 12a, the intake air sensor 13, the coolant thermosensor 14 and the oxygen sensor 15. The unit 10 is a microcomputer, for example. Furthermore, the unit 10 receives an output from the crank position sensor 11 through a waveform shaping circuit 11a, and is connected with an ignition circuit 17 as an actuator driving circuit.

The unit 10 is also connected to an auxiliary knocking detection unit 20. The detection unit 20 is connected with the crank position sensor through the shaping circuit 11a, and is also connected with a knock sensor 18 through an amplification circuit 19.

The detection unit 20 comprises a central processing unit (abbreviated to CPU hereafter) 21, a read only memory (ROM) 22, a random access memory (RAM) 23, a serial control interface (SCI) 24, an analog/digital (A/D) converter 25, first to fourth timers 26a to 26d, an input/output (I/O) interface 27, and a bus line 28 for connecting them each other. The waveform shaping circuit 11a is connected through the interface 27, the main control unit 10 is connected through the SCI 24, and the amplification circuit 19 of the knock sensor 18 is connected through the converter 25.

The crank position sensor 11 is constructed by an electromagnetic pickup detecting projections 1e (or slits) formed on the rotor 1d. A magnetic flux changes when the projections 1e approach and pass to and from sensor 11 in accordance with the rotation of the rotor 1d. The sensor 11 generates an alternating current depending on the magnetic flux change and the wave shaping circuit 11a converts the alternating current into pulses as crank angle signals.

In the case of a six cylinder engine which has the top dead centers (TDC) of cylinders every 120 degrees, for example, the wave shaping circuit 11a outputs the crank angle signals every 30 degrees from 10 degrees before the top dead center (BTDC). That is, the crank angle signals at BTDC 10, 40, 70 and 100 degrees are supplied to the main control unit 10 to calculate the ignition timing and the like. An ignition timing signal is output to the ignition circuit at a calculated ignition timing with reference to the crank angle signals of every 30 degrees.

Furthermore, the sensor 11 outputs signals every 120 degrees representing BTDC 10 degrees to the knocking detection unit 20 to start interruption processing.

The knock sensor 18 is connected with a constant current power supply $V_{CC}$ via a resistor R and constructed, for example, by a resonance type knock sensor having an oscillator which has a natural frequency being substantially the same as a vibration by knocking, and a piezoresistive element for converting a vibrational acceleration detected by the oscillator into electrical signals. The sensor 18 detects the vibration propagated in a cylinder block of the engine depending on a combustion pressure at a compression (firing) stroke, and outputs an analog vibration waveform as electrical signals.

The analog waveform signals are converted into digital data by the converter 25 of the unit 20 after the circuit 19 amplifies the signals to a predetermined level. Upon A/D conversion, high-speed sampling is performed in order to precisely convert the vibration waveforms.

The CPU 21 starts an internal interruption processing by the first to fourth timers 26a to 26d depending on the signals from the crank sensor 11 to convert the signals from the knock sensor 18 during two A/D conversion terms according to a program for the knocking detection stored in the ROM 22. The CPU 21 determines whether the knocking occurs or not to transmit a determined result to the main control unit 10 through the SCI 24.

The main unit 10 immediately delays an ignition timing of the corresponding cylinder to avoid knocking when the detection unit 20 outputs a signal representing the occurrence of knocking.

Next, there will be described a functional construction of the detection unit 20 with reference to FIG. 2. The detection unit 20 comprises an A/D conversion circuit 30 (converter 25), a sampling period setting circuit 31, an A/D conversion term setting circuit 32, a knocking level calculating circuit 33, a discrimination level setting circuit 34, and a knocking determination circuit 35. The unit 20 exclusively processes the knocking detection procedure at high-speed.

The conversion circuit 30 converts the analog signals from the knock sensor 18 into digital data by the converter 25 every sampling period set by the setting circuit 31 during an A/D conversion term set by the setting circuit 32 to output the data to the calculation circuit 33 and the setting circuit 34.

The period setting circuit 31 sets the sampling period for the A/D conversion in the circuit 30 during the A/D conversion term set by the circuit 32 to output the sampling period to the conversion circuit 33 and the discrimination level setting circuit 34. The sampling period is set in the fourth timer 26d to a period $T_S$ to produce the vibration waveforms fidelity, such as 30 micro seconds The term setting circuit 32 sets a first A/D conversion term corresponding to a period when knocking does not occur and further sets a second A/D conversion term corresponding to a period when knocking occurs, respectively responsive to the signals from the crank position sensor 11. Then, the circuit 32 outputs result signals to the conversion circuit 30, the sampling period setting circuit 31, the knocking level calculation circuit 33, and the discrimination level setting circuit 34.

The knocking occurrence range moves in the crank angle depending on the engine speed, so that a start time and an end time of each term may be changed responsive to an engine speed. Namely, both A/D conversion terms are respectively set based on a predetermined map in direct or by the interpolational calculation corresponding to the engine speed $S_E$ upon the signals output from the crank position sensor 11. The map is made based on the experiment. Accordingly, starting times T1S and T2S of the first and second A/D conversion terms in the first and second timers 26a and 26b, respectively, and end times T1E and T2E of both terms in the third timer 26c, respectively. The terms may be fixed at a predetermined crank angle range, in which all of the knocking arise.

The knocking level calculating circuit 33 substracts an intermediate value P0 of an amplitude of the vibration waveform from the digital data Pi at every sampling timings during the second A/D conversion term. Resulting values at every sampling timings are integrated. An average value P2 is calculated by dividing the integrated value by a sampling number $N_S$ after the second A/D conversion term. Thus, the average value P2 during the second A/D conversion term is calculated by the following equation (1).

$$P2 = 1/N_S \Sigma |Pi - P0| \tag{1}$$

The value P2 as a knocking level is output to the knocking determining circuit 35.

The discriminating level setting circuit 34 calculates an average value P1 of the digital data Pi during the first A/D conversion term in the same as a parameter to set the knocking discriminating level in the same manner as the knocking level calculating circuit 33 according to the following equation (2).

$$P1 = 1/N_S \Sigma |Pi - P0| \tag{2}$$

Next, a population mean value $P_{1AVE}$ of the average value P1 is calculated. A discrimination level $P_{KN}$ is calculated by adding a predetermined offset value $P_{OFFSET}$ to the population mean value.

Thus, the average value P1 of a present cycle N of the engine is calculated after the first A/D conversion term. Next, a population mean value $P_{1AVE}^*$ which represents a mean of average values from first cycle to the previous cycle (N−1) is multiplied by the cycle number (N−1), and the multiplied value is added to the present average value P1. The added value is divided by the cycle number N, thereby calculating a present population mean value $P_{1AVE}$ of N cycle from first cycle to the present cycle of the engine according to the following equation (3).

$$P_{1AVE} = 1/N\{(N-1) \times P_{1AVE}^* + P1\} \tag{3}$$

The predetermined offset value $P_{OFFSET}$ adds to the mean value $P_{1AVE}$ according to the following equation (4) to obtain the present discrimination level $P_{KN}$, thereby outputting the level $P_{KN}$ to the knocking determining circuit 35.

$$P_{KN} = P_{1AVE} + P_{OFFSET} \tag{4}$$

The determining circuit 35 compares the knocking level P2 calculated by the calculating circuit 33 with the determination level $P_{KN}$ by the setting circuit 34. When P2 $P_{KN}$, the circuit 35 determines no knocking in the engine. When P2 $P_{KN}$, the circuit 35 determines the knocking occurrence to transmit the knocking determination signal to the main circuit 10 through the SCI 24.

There will be described the setting procedure of the knocking detection level hereinunder.

The above-described processing is executed by the internal interrupting processing by the first to fourth timers 26a to 26d as shown in FIG. 5(c) to 5(f).

Figure 3A:
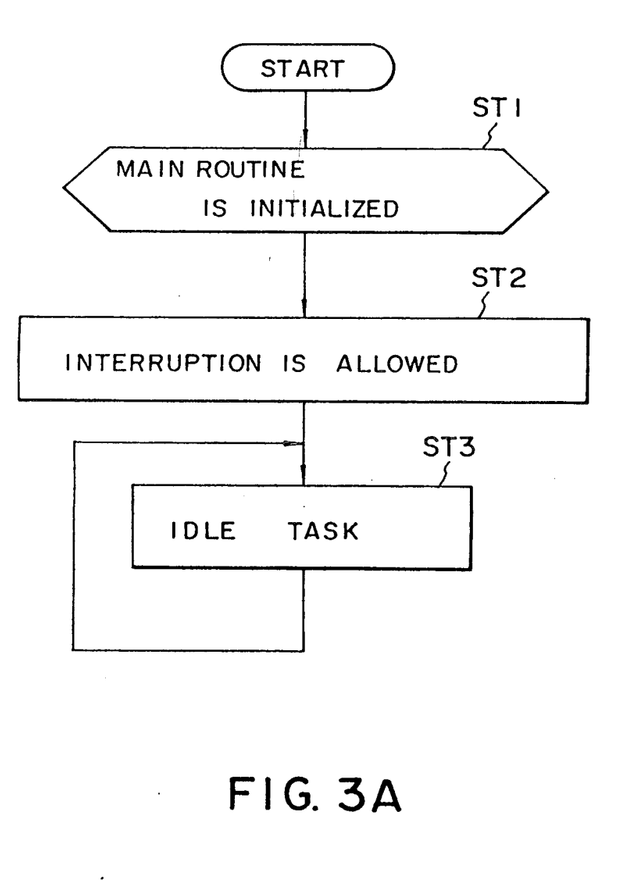
FIGS. 3A to 3E are flow charts showing knocking detection procedure of the device according to first and second embodiments of the present invention.

First, the knocking detection unit 20 is initialized in an interruptive vector, various flags, and register in a step ST1 of a main routine as shown in FIG. 3A.

Secondly, the procedure advances in a step ST2, the CPU 21 allows to be interrupted at every 30 CA degrees corresponding to the signals from the crank sensor 11, to therefore execute an idle task in a step ST3. At this time, the CPU 21 enters the stand-by condition to execute the knocking detection processing when the interruption occurs.

Figure 3B:
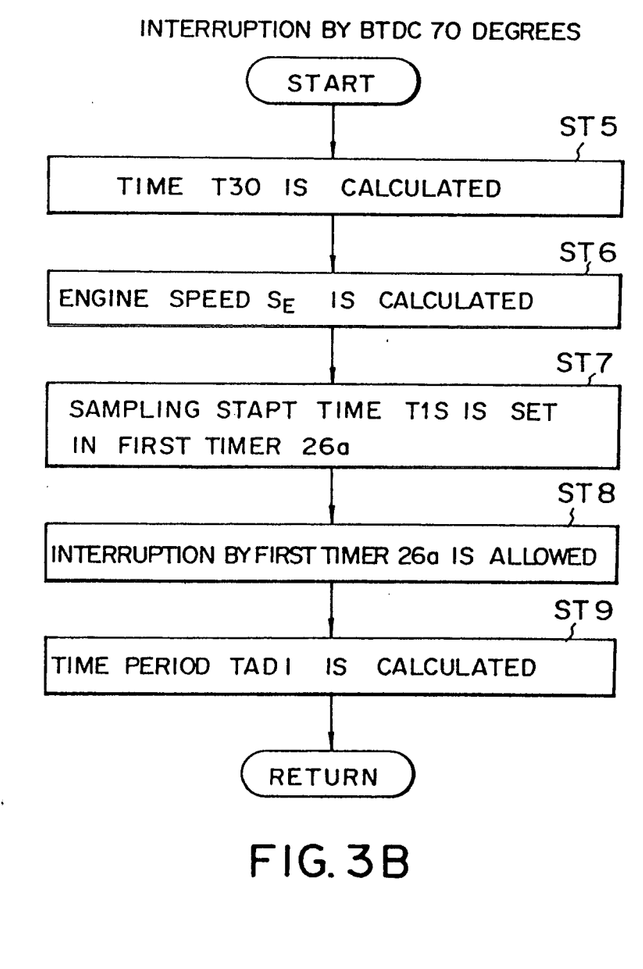
Figure 5:
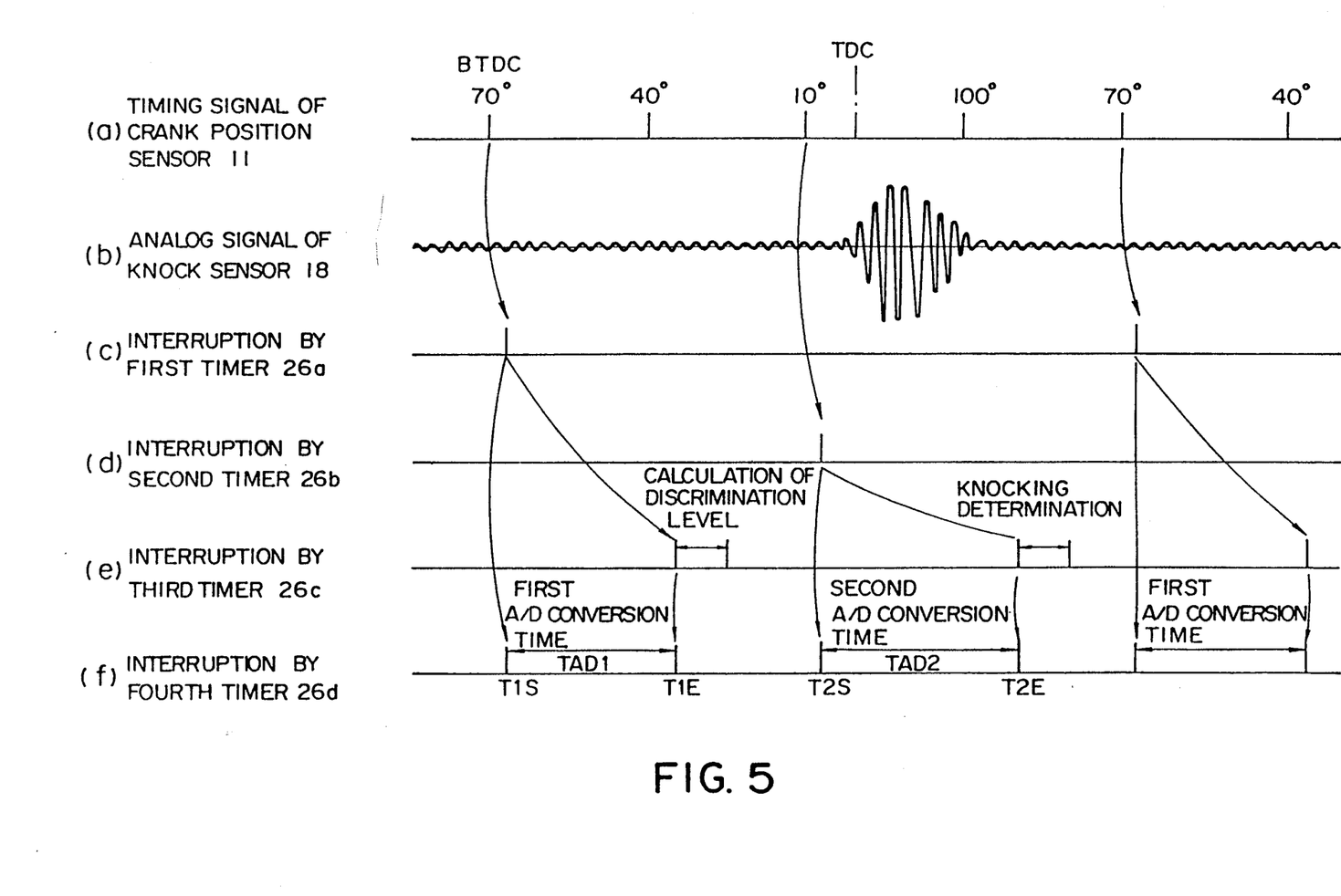
FIG. 5 is a timing chart showing an interruption timing of the knocking detection of the device according to the first and second embodiments of the present invention.

Next, for example, in six-cylinder engine, when the sensor 11 outputs the signal of BTDC 70 CA degrees to the CPU 21 as shown in FIG. 5(a), the CPU 21 starts an external interruption processing to calculate a lapsed time T30 corresponding to 30 degrees of the crank angle in a step ST5, as shown in FIG. 3B. The lapsed time T30 is a time between signals from the crank sensor 11 supplied with every 30 CA degrees.

Advanced in a step ST6, the engine speed $S_E$ is calculated depending on the time T30 calculated in a step ST5 to continue to a step ST7.

In the step ST7, the start time T1S of the first conversion term, that is, the start time T1S for converting the signals from knock sensor 18 into the digital data, is set in the first timer 26a depending on the engine speed $S_E$ calculated in the step ST6. Operation then continues to a step ST8.

In the step ST8, the CPU 21 allows to be interrupted by the first timer 26a. Advanced in a step ST9, a time period TAD1 of the first A/D conversion term is calculated in dependency on the engine speed $S_E$, and the operation returns to the main routine.

Figure 3C:
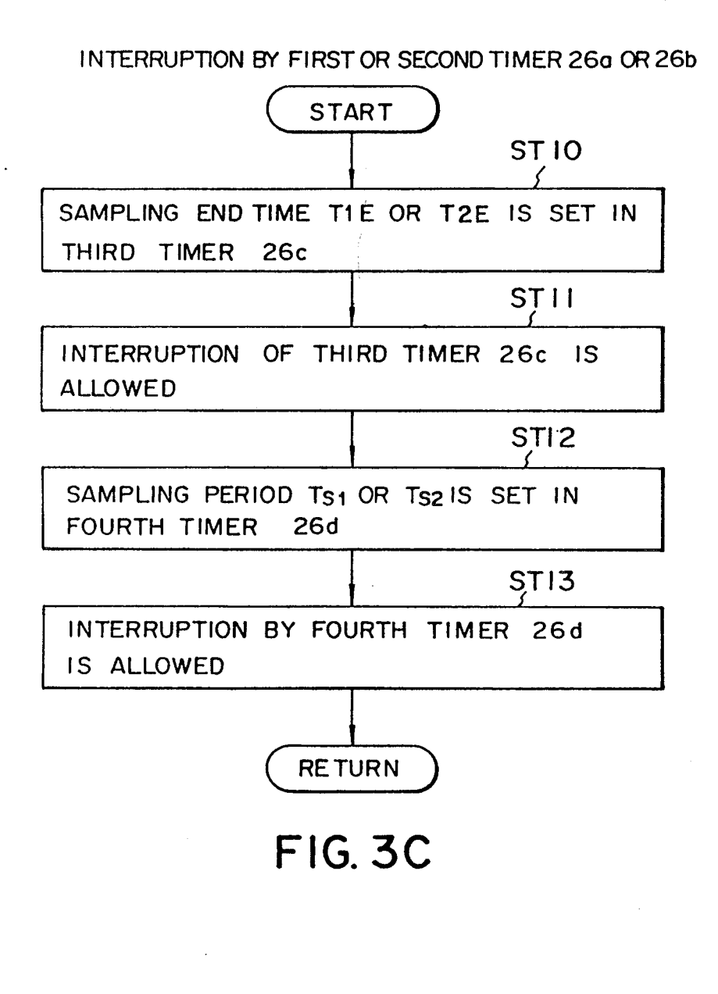

Next, the internal interruption by the first timer 26a occurs when the first timer 26a reaches to the time T1S. Then, an end time T1E (=T1S+TAD1) of the first A/D conversion term is set in the third timer 26c in a step ST10 as shown in FIG. 3C. In a step ST11, the CPU 21 allows to be interrupted by the third timer 26c.

Next, operation advanced to a step ST12. The sampling period TS1 for the A/D conversion is set in the fourth timer 26d. Furthermore, in a step ST13, the CPU 21 allows to be interrupted by the timer 26d and then, ends the interruption of the first timer 26a to return the main routine.

Figure 3D:
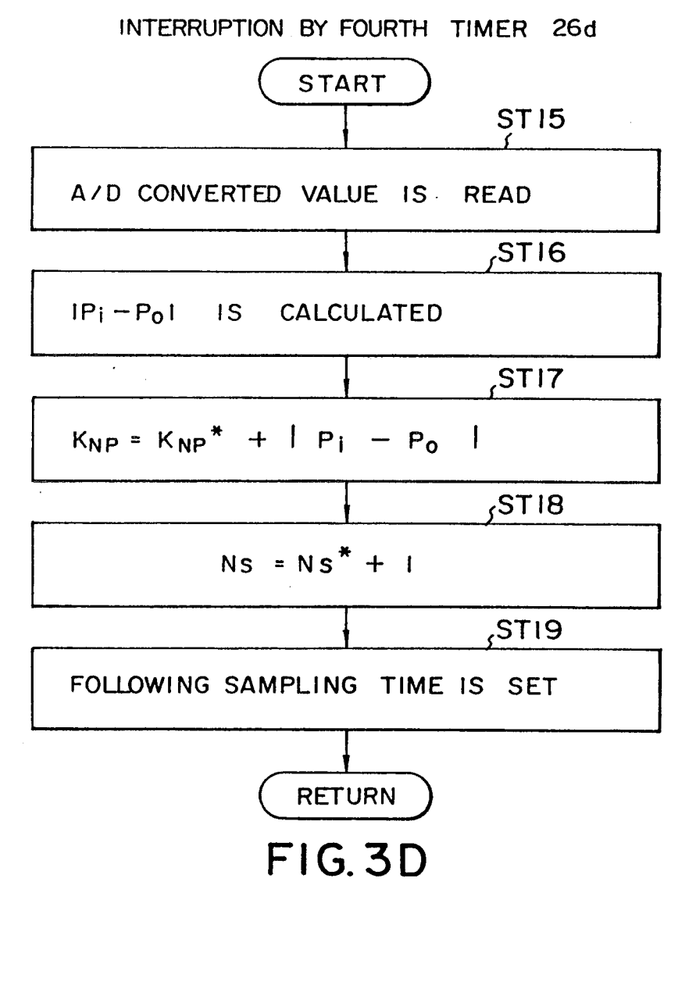

Accordingly, an interruption routine by the fourth timer 26d as shown in FIG. 3D immediately starts after the end of the interruption by the first timer 26a, to therefore execute the A/D conversion at every sampling period $T_{S1}$ set in the step ST12.

In a step ST15 as shown in FIG. 3D, the digital data Pi is read out, which are converted from the analog vibration waveform of the sensor 18 by the converter 25. In a step ST16, the CPU 21 calculates a difference value between the digital data Pi and the intermediate value P0 of the amplitude of the vibration waveform.

In a step ST17, the CPU 21 adds the present difference value to a integrated value $K_{NP}^*$, which is result of the integration of the difference values until the previous sampling timing, to calculate the renewal integrated value "$K_{NP}(K_{NP} = K_{NP}^* + |Pi - P0|$".

Then, operation continues to a step ST18.

In the step ST18, the sampling number $N_S$ until the present time is calculated by adding "1" to the sampling number $N_S^*$ of the previous sampling timing ($N_S = N_S^* + 1$). In a step ST19, the following sampling timing is set in the A/D converter 25, thereby ending the routine. In the next sampling timing, steps ST15 to ST19 are repeated again.

The sampling period $T_S$ is set at such as 30 micro seconds to precisely digitize the vibration waveforms from the knock sensor 18.

Figure 4:
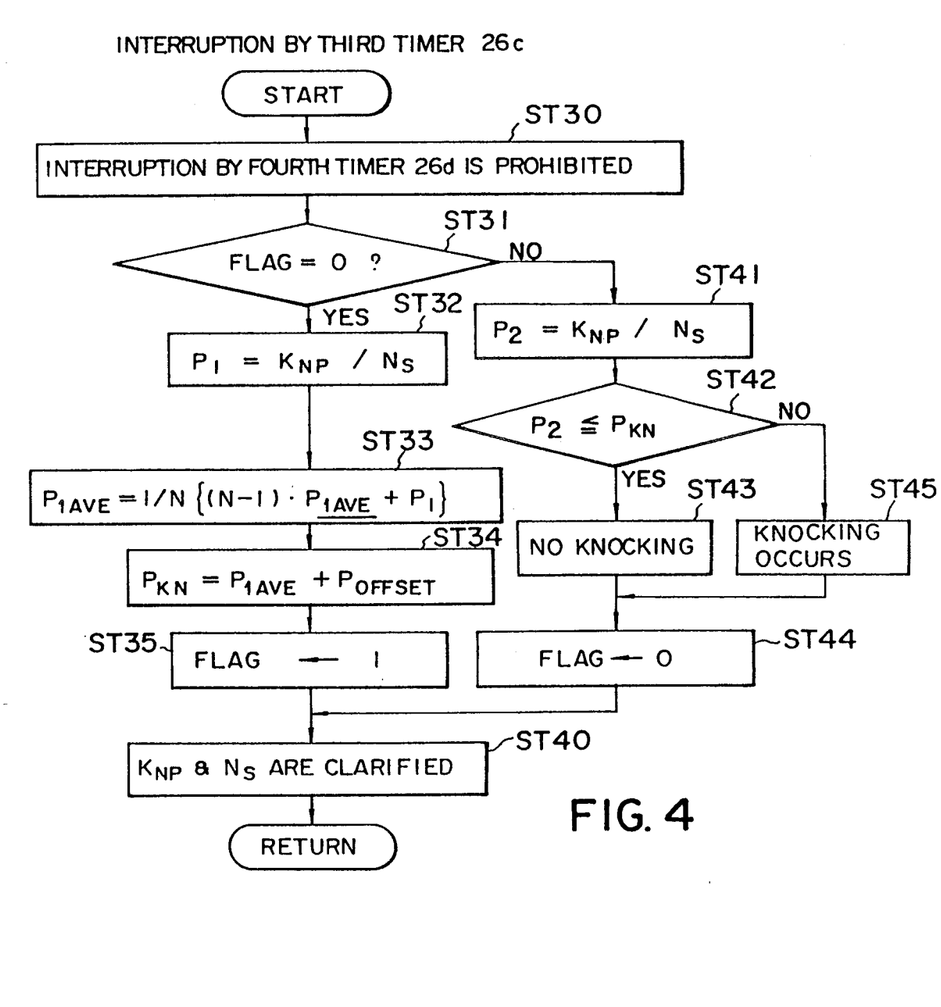
FIG. 4 is a flow chart showing an interruption by a third timer of the knocking detection device according to the first embodiment of the present invention.

An internal interruption by the third timer 26c as shown in FIG. 4 starts when operation advances to the end time T1E of the first A/D conversion term set in the step ST10 of the interruption by the first timer 26a.

In a step ST30 of the interruption by the third timer 26c, the CPU 21 prohibits the interruption by the fourth timer 26d in which the sampling processing of the A/D converted value is executed. In a step ST31, the CPU 21 determines whether or not a flag is 0. As the flag is set zero at the calculation of the discrimination level, operation advances to a step ST32 to calculate the average value P1 (P1=$K_{NP}/N_S$) of the digital data Pi converted during the first A/D conversion term in the step ST32.

In a step ST33, the CPU 21 calculates the population mean value $P_{1AVE}$ by the equation (3).

In a step ST34, the CPU 21 adds the offset value $P_{OFFSET}$ to the population mean value $P_{1AVE}$ in the step ST33, so as to obtain the discrimination level "$P_{KN}$ ($P_{KN}=P_{1AVE}+P_{OFFSET}$)".

In a step ST35, the flag is set "1" (FLAG=1). In a step ST40, the integrated value $K_{NP}$ and the sampling number $N_S$ are cleared to return the main routine, so as to end the discrimination level detection procedure.

There is described hereinunder the knocking detection procedure.

Figure 3E:
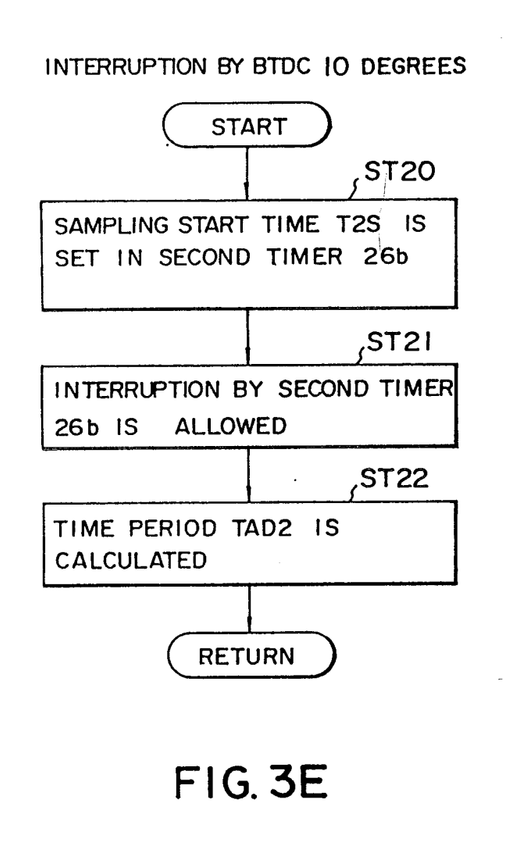

An external interruption occurs, as shown in FIG. 3E, when an interruption signal of the crank angle 10 CA degrees is supplied from the crank sensor 11, which represents a fixed ignition timing. In a step ST20, a sampling start time of the signal from the knock sensor 18, i.e., a start time T2S of knocking level detection is set in dependency on the engine speed $S_E$ calculated in processing of the interruption at the crank angle 70 CA degrees, so as to set the time T2S in the second timer 26b.

In a step ST21, the CPU 21 allows to be interrupted by the second timer 26b, and in a step ST22, a period TAD2 of the second A/D conversion term is calculated in dependency on the engine speed $S_E$ to return operation to the main routine.

An internal interruption of the second timer 26b occurs at the time T2S in the same manner as the discrimination level detection procedure as mentioned above. Then, the end time T2E of the second A/D conversion term and the sampling period $T_{S2}$ are respectively set in the third and fourth timer 26c and 26d for the knocking detection, so as to execute the sampling process of the converted value responsive to the interruption by the fourth timer 26d.

The sampling period $T_{S2}$ is set substantially at 30 micro seconds to be able to accurately digitize the vibration signals from the knock sensor 18.

The sampling period $T_{S1}$ in the first A/D conversion term and the sampling period $T_{S2}$ in the second A/D conversion term are suitably set as mentioned above. Accordingly, the period $T_{S1}$ may be the same sampling period as the period $T_{S2}$. There are eliminated a description of an interruption of the second and fourth timers 26b and 26d because of the same procedure as the detection of the discrimination level, that is, the interruptions by the first and fourth timers 26a and 26d as shown in FIGS. 3C and 3D.

There will be described the processing of the knocking determination by the third timer 26c according to FIG. 4.

In the step ST30, the CPU 21 prohibits the interruption by the fourth timer 26d in which the sampling processing of the A/D converted value is executed. In the step ST31, the CPU 21 determines whether or not the flag is set to zero. In this case, as the previous interruption routine by the third timer 26c is set to a calculation mode of the discrimination level, the flag is set to "1" (FLAG=1) in the step ST35 of the previous routine. Accordingly, operation advances from the ST31 to a step ST41. In the step ST41, the CPU 21 calculates the average value P2 (P2=$K_{NP}/N_S$) of the digital data Pi converted during the second A/D conversion term, which represents the knocking level or a knocking strength.

In a step ST42, the CPU 21 compares the average value P2 (the knocking level) calculated in the step ST41 with the discrimination level $P_{KN}$ calculated in the discrimination level detection procedure as mentioned above. No knocking is determined in a step ST43 when the value P2 is less than the value $P_{KN}$ (P2<$P_{KN}$), and operation continues to a step ST44. On the other hand, the knocking occurrence is determined in a step ST45 when the value P2 is on or more than the value $P_{KN}$ (P≧$P_{KN}$) In the step ST45, the CPU 21 transmits the knocking signals to the main control unit 10 through the SCI 24, and operation continues to the step ST44.

In the step ST44, the flag is set to zero (FLAG←0). In the step ST40, the integral value $K_{NP}$ and the sampling number $N_S$ are clarified, thereby returning to the main routine.

According to the above mentioned procedure, the vibration waveforms from the knock sensor 18 are supplied to the knocking detection unit 20, to therefore determine the presence or absence of knocking. If the signal representing the knocking occurrence is transmitted to the main control unit 10, the main unit 10 immediately outputs the ignition signals to the ignition circuit 17 in order to avoid the knocking of the engine.

Though the first embodiment is described to have the auxiliary knocking detection unit 20 for detecting knocking, the present invention is not limited in such a construction. For example, the main control unit 10 can perform the knocking detection.

Furthermore, the knock sensor 18 is not limited to using the resonance type sensor for detecting the mechanical vibration of the engine propagated in the cylinder block. For example, the present invention uses knock sensors for detecting the combustion pressure, or the vibration noise of the engine as the waveform.

Figure 6:
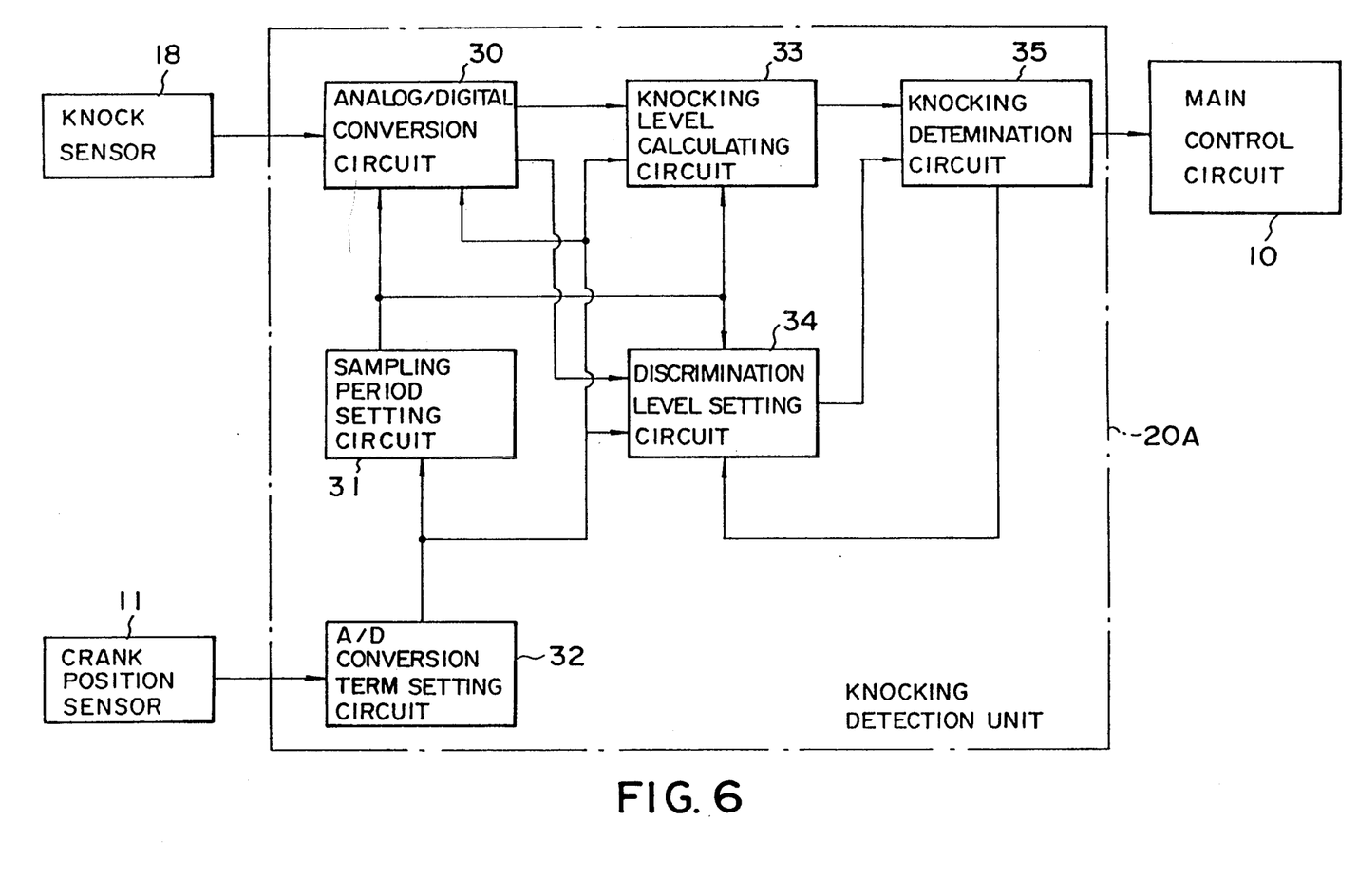
FIG. 6 is a block diagram showing a function of the device according to the second embodiment of the present invention.

Still furthermore, the knocking detection device according to the first embodiment as mentioned above, sets the discrimination level at every BTDC 70 CA degrees, but the present invention is not limited in such function. The present invention may have a construction of a second embodiment as shown in FIG. 6.

Namely, a discrimination level setting circuit 34 in a knocking detection unit 20A does not execute the sampling of an A/D converted result in the first A/D conversion term of the discrimination level detection procedure when a knocking detecting circuit 35 detects the knocking in the immediately prior knocking detection procedure, so as to set the last discrimination level $P_{KN-1}$ as the present discrimination level.

In the case of the first embodiment, even when strong knocking occurs and the vibration waveform thereof continues to the first A/D conversion term through the second A/D conversion term, the discrimination level $P_{KN}$ increases. However, the unit 20A of the second embodiment can usually set the proper discrimination level $P_{KN}$ against the strong knocking, thereby preventing determination errors based on the increase of the discrimination level $P_{KN}$.

The knocking determining circuit 35 compares the knocking level P2 calculated by the circuit 33 and the discrimination level $P_{KN}$ set by the circuit 34, so as to determine the absence of knocking when P2<$P_{KN}$, or the presence of knocking when P2>$P_{KN}$. The determined result of the knocking is output to the discrimination level setting circuit 34, and at the same time is transmitted to the main control circuit 10 through the SCI 24.

Figure 2:
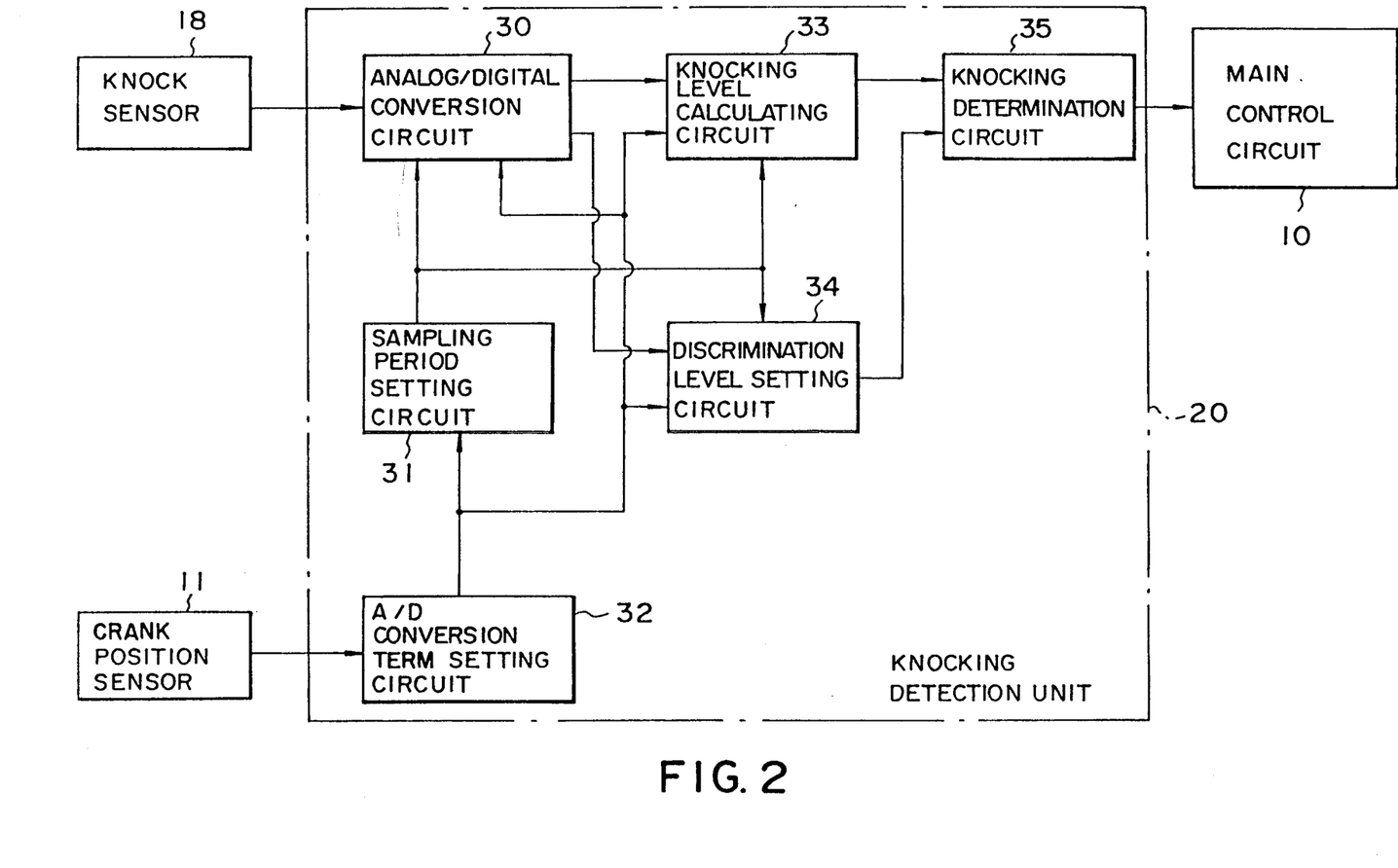
FIG. 2 is a block diagram showing a function of the device according to a first embodiment of the present invention.

The construction of the unit 20A shown in FIG. 6 is different from the detection unit 20 shown in FIG. 2 at the point of having a feedback line which feeds the output of the determination circuit 35 back to the setting circuit 34.

A duplicate explanation about the detection unit 20A is eliminated because the procedure of the unit 20A is the same one as the unit 20 of the first embodiment explained by using FIGS. 3A to 3E.

The second embodiment is different from the first embodiment at the point of the interruption for the knocking determination by the third timer 26c. The different procedure of the second embodiment is explained, with reference to FIG. 7.

Figure 7:
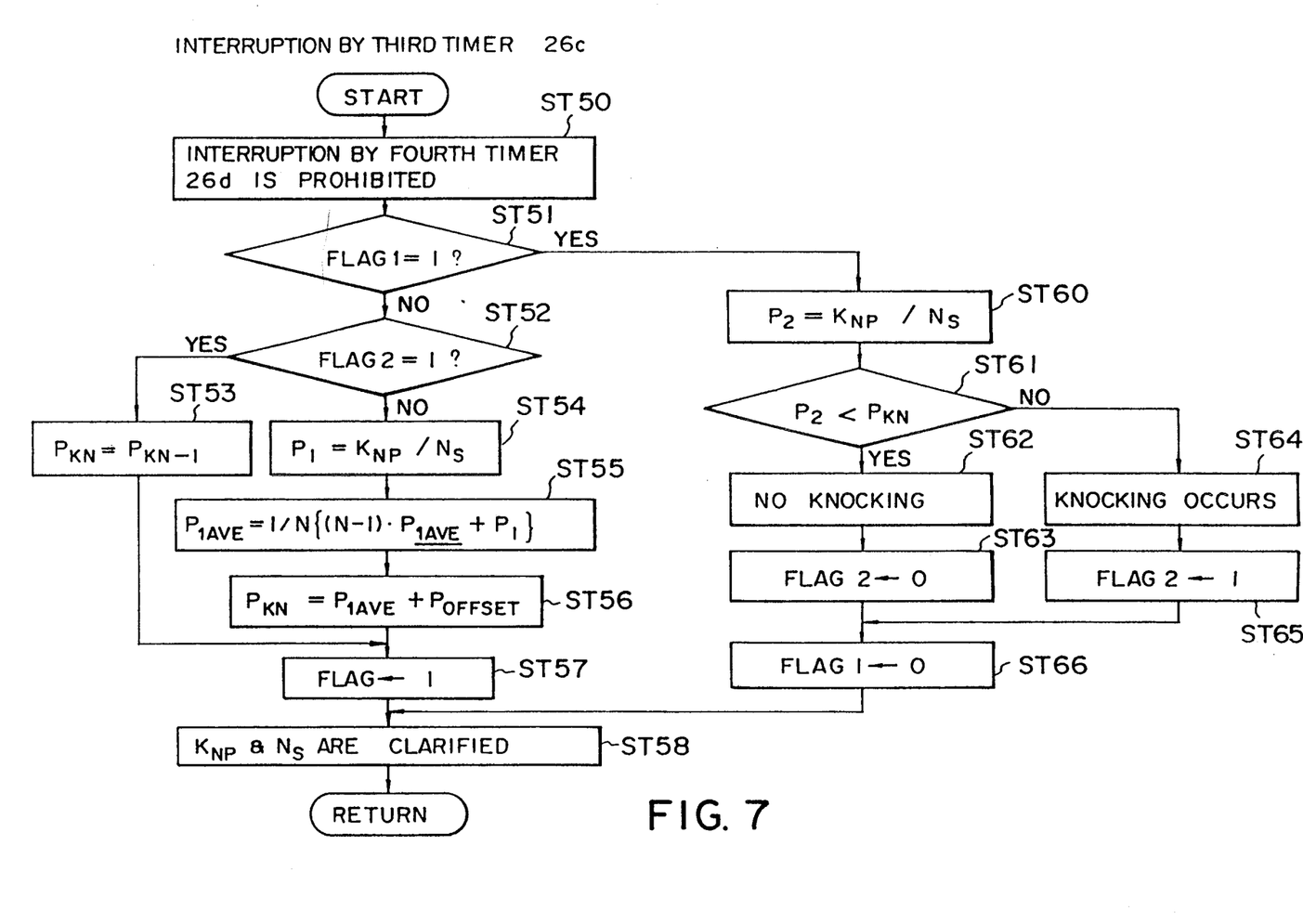
FIG. 7 is a flow chart showing an interruption by a third timer of the knocking detection device according to the second embodiment of the present invention.

In a step ST50, the CPU 21 prohibits the interruption by the fourth timer 26d in which the sampling processing of the A/D converted value is executed. In a step ST51, the CPU 21 determines whether or not the knocking discrimination flag is set to "1". In the case that the present routine is for the knocking detection procedure, the flag is to be set to "1" (FLAG1=1). Accordingly, operation continues to a step ST60 from the step ST51, the CPU 21 calculates the average value P2 (P2=$K_{NP}/N_S$) of the digital data Pi of the knock sensor 18, that is the knocking level or the knocking strength in the second A/D conversion term, to therefore continue to a step ST61.

In the step ST61, the average value P2 (the knocking level) is compared with the discrimination level $P_{KN}$ set by the previous interruption routine by the third timer 26c. When the value P2<$P_{KN}$ in the step ST61, no knocking occurrence is determined in a step ST62. Then, the CPU 21 clarifies a knocking occurrence flag FLAG2 in a step ST63 and further operation advances to a step ST66.

On the other hand, operation advances to a step ST64 through the step ST61 when the value P2≧$P_{KN}$, to determine the knocking occurrence and to transmit the signals representing the knocking occurrence to the main control unit 10 through the SCI 24. Then, the knocking occurrence flag FLAG2 is set to "1" in a step ST65, and operation continues to the step ST66.

In the step ST66, the knocking determination flag FLAG1 is clarified, and operation advances to a step ST58. In the step ST58, the integrated value $K_{NP}$ and the sampling numerals $N_S$ during the second A/D conversion term are clarified to return the main routine.

When the third timer 26c reaches to the end time $T_{1E}$ of the first A/D conversion term, the interruption characterized by FIG. 7 occurs again. In step ST50, the CPU 21 prohibits the interruption by the fourth timer 26d in which the sampling processing of the A/D converted value is executed. In the step ST51, the CPU 21 determines whether the knocking discrimination flag is set to "1" or not. In this case, as the present routine is for the detection procedure of the discrimination level, the flag is to be set to "0" (FLAG1=0). Accordingly, operation goes to a step ST52, and the CPU 21 checks the knocking occurrence flag FLAG2. When the flag FLAG2 is to be set to "0", that is, when the knocking is detected in the previous knocking detection procedure, operation goes to a step ST54. After that, the CPU 21 calculates the discrimination level in the same manner as the first embodiment through steps ST54, ST55 and ST56.

On the other hand, when the knocking is detected in the previous knocking detection procedure, i.e., FLAG=1 in the step ST52, operation moves to a step ST53. In the step ST 53, the CPU 21 sets the last discrimination level $P_{KN-1}$ as the present level $P_{KN}$.

After the step ST56 or ST53, the CPU 21 sets the flag (FLAG1=1), so as to provide the program of FIG. 7 for next knocking detection procedure (from the step ST60 to the step ST66). Then, the CPU 21 clarifies the integrated value $K_{NP}$ and the sampling numbers $N_S$ and returns to the main routine.

As described above in detail, the knocking detection device according to the present invention comprises the A/D conversion circuit for directly converting the vibration waveforms from the knock sensor into digital data every sampling period, the A/D conversion term setting circuit for deciding the first and second conversion terms, the discrimination level calculating circuit for calculating the discrimination level based on the average value of the output from the A/D conversion circuit during the first conversion term, the knocking level calculating circuit for calculating the knocking level based on the average value of the output from the A/D conversion circuit during the second conversion term, and the knocking determination circuit for determining whether or not the knocking occurs by comparing the knocking value with the discrimination level. Accordingly, it is possible to process the vibration waveforms from the knock sensor without depending upon an analog circuit.

Accordingly, the device of the present invention has the improvement of the reliability of the knocking detection and the processing speed because the circuit element are not influenced by the changes with lapse of time and the circuit characteristics of the analog circuit.

Further, the present invention need not set the circuit constant of the circuit elements in the analog circuit, thereby eliminating errors of the constant. Accordingly, the present invention has many effects in that the knocking detection is precise, the number of parts of the circuit elements decreases, and it is possible to reduce the manufacturing costs.

Furthermore, in the case of providing the auxiliary control unit for exclusively processing the output of the knock sensor except the main control unit for controlling the ignition timing, it is possible to decrease the sampling period of the auxiliary unit regardless of the main unit, so that the sampled digital data may reproduce the analog waveform output from the knock sensor.

Still furthermore, the discrimination level is renewed dependency the output of the A/D conversion circuit after the first conversion term when the knocking determining circuit determines no knocking during the previous second conversion term, while the previous level is set as the present level when the determining circuit determines knocking in the engine. Accordingly, the present invention has the excellent effects of preventing an error at the knocking detection, to usually and properly detect the knocking, and to improve an output performance, because the discrimination level is not influenced by the knocking strength.

While the presently preferred embodiments of the present invention have been shown and described, it is to be understood that this disclosure is for the purpose of illustration and that various changes and modifications may be without departing from the scope of the invention as set forth in the appended claims.

What is claimed is:

1. A knocking detection device for an automotive engine
    adapted for receiving a signal from a knock sensor for detecting analog vibration waveforms due to knocking in said engine;
    and further adapted to receive a signal from a crank position sensor for producing a crank position signal at a predetermined crank angle of said engine;
    said device comprising conversion term setting means responsive to said crank position signal for setting in one cycle of said engine, a first conversion term in which knocking never occurs and a second conversion term in which knocking may occur;
    sampling period setting means for setting a first sampling period and a second sampling period for the analog/digital conversion of said analog vibration waveforms in said first conversion term and said second conversion term, respectively, at least said second sampling being set so as to precisely digitize said vibration waveforms;
    conversion means for converting said vibration waveforms sampled every first sampling period set by said sampling period setting means into digital data during said first conversion term and for converting said vibration waveforms sampled every second sampling period set by said sampling period setting means into digital data during said second conversion term;
    discrimination level setting means for setting, after said first conversion term is terminated, a discrimination level to be used for determining the occurrence of knocking, on the basis of an average value of said digital data digitized in said first converting term;
    knocking level calculating means for calculating, after said second conversion term is terminated, a knocking level of said engine on the basis of an average value of said digital data converted during said second conversion term; and
    determination means for determining the occurrence of knocking by comparing said knocking level with said discrimination level.

2. The device according to claim 1, wherein said conversion term setting means is adapted to vary said first conversion term and said second conversion term in dependence on an engine speed upon said crank signal.

3. The device according to claim 1, wherein said discrimination level setting means includes:
    first means for averaging amplitude values of said digital data digitized in said first conversion term so as to produce said first average value;
    second means for calculating a mean value between said first average value and a previous value of said mean value calculated in previous cycle of the engine; and
    third means for calculating said discrimination value by adding a predetermined offset value to said mean value.

4. The device according to claim 3, wherein said discrimination level setting means further includes:
    fourth means for setting a previous value of said discrimination level as a present value thereof when said determination means determine the occurrence of knocking.

5. The device according to claim 1 mounted on a vehicle.

6. The device according to claim 1 combined with a knock sensor and a crank position sensor.

7. The device according to claim 1 further comprising:
    control means for controlling the ignition timing of the engine so as to avoid knocking when said determination means determines the occurrence of knocking.

8. A method for detecting knocking of an automotive engine having a knock sensor for detecting analog vibration waveforms due to knocking in said engine and a crank position sensor for producing a crank position signal at a predetermined crank angle of said engine, the method comprising the steps of:
    setting a first conversion term in which knocking never occur in one cycle of said engine in response to said crank position signal;
    setting a first sampling period for the analog/digital conversion of said analog vibration waveforms in said first conversion term;
    converting repeatedly said vibration waveforms sampled every first sampling period into digital data during said first conversion term;
    setting, after said first conversion term is terminated, a discrimination level to be used for determining the occurrence of knocking, on the basis of an average value of said digital data digitized in said first converting term;
    setting a second conversion term in which knocking may occur, said second conversion term being separate from said first conversion term in one cycle of said engine;
    setting a second sampling period for the analog/digital conversion of said analog vibration waveforms in said second conversion term, said second sampling period being set so as to precisely digitize said vibration waveforms;
    converting repeatedly said vibration waveforms sampled every second sampling period into digital data during said second conversion term;
    calculating, after said second conversion term is terminated, a knocking level of said engine on the basis of an average value of said digital data converted during said second conversion term; and
    determining the occurrence of knocking by comparing said knocking level with said discrimination level.

* * * * *